(12) United States Patent
Miller et al.

(10) Patent No.: US 8,416,532 B1
(45) Date of Patent: Apr. 9, 2013

(54) CONTINUOUS STAINLESS STEEL GROUND PLANE FLEXURE FOR A DISK DRIVE HEAD SUSPENSION

(75) Inventors: Mark A. Miller, Hutchinson, MN (US); Reid C. Danielson, Cokato, MN (US); Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 1380 days.

(21) Appl. No.: 11/734,932

(22) Filed: Apr. 13, 2007

Related U.S. Application Data

(60) Provisional application No. 60/791,694, filed on Apr. 13, 2006.

(51) Int. Cl.
*G11B 5/48* (2006.01)
*G11B 21/16* (2006.01)

(52) U.S. Cl.
USPC .................. 360/245.9; 360/244.3; 360/245.3

(58) Field of Classification Search ............... 360/245.3, 360/245.8, 245.9, 244.3, 245.5, 246
See application file for complete search history.

(56) References Cited

U.S. PATENT DOCUMENTS

| | | | |
|---|---|---|---|
| 5,598,307 A * | 1/1997 | Bennin | 360/245.9 |
| 5,995,329 A | 11/1999 | Shiraishi et al. | |
| 6,377,425 B1 | 4/2002 | Khan | |
| 6,714,385 B1 | 3/2004 | Even et al. | |
| 6,992,850 B2 | 1/2006 | Nishiyama | |
| 7,016,156 B2 | 3/2006 | Maruyama et al. | |
| 7,023,667 B2 | 4/2006 | Shum | |
| 2006/0044695 A1 * | 3/2006 | Erpelding | 360/245.9 |
| 2006/0262456 A1 * | 11/2006 | Wang et al. | 360/245.3 |

* cited by examiner

*Primary Examiner* — Craig A. Renner
*Assistant Examiner* — Gustavo Polo
(74) *Attorney, Agent, or Firm* — Faegre Baker Daniels LLP

(57) ABSTRACT

An integrated lead flexure comprising a base region, a gimbal extending from the base region and conductive traces. The gimbal includes spring arms and a slider mounting region extending from the spring arms. The conductive traces include one or more unsupported trace sections extending from head bond pads on the slider mounting region to the base region off of the spring arms. One or more metal islands on the unsupported trace sections enhance the impedance characteristics of traces. An insulating layer is located between the traces and the metal islands.

16 Claims, 4 Drawing Sheets

CONTINUOUS STAINLESS STEEL GROUND PLANE FLEXURE FOR A DISK DRIVE HEAD SUSPENSION

REFERENCE TO RELATED APPLICATION

This application claims the benefit of U.S. Provisional Application Ser. No. 60/791,694, filed Apr. 13, 2006 and entitled Continuous SST Ground Plane Flexure Circuit, which is incorporate herein by reference.

FIELD OF THE INVENTION

The invention is an integrated lead or wireless flexure for a disk drive head suspension.

BACKGROUND OF THE INVENTION

Disk drive head suspensions having integrated lead or wireless flexures are known and disclosed, for example, in the Shum U.S. Pat. No. 7,023,667. Suspensions such as those shown in the Shum patent include a flexure mounted to a stainless steel (i.e., a spring metal) load beam. The load beam has a rigid or beam region extending from a spring region. The flexure has a mounting or base region that attaches to the beam region of the load beam and a gimbal extending from the base region. The gimbal includes pair of laterally-spaced spring arms connected by a cross member, and a tongue extending from the cross member into the area between the spring arms. A head slider having read/write heads is mounted to a slider mounting area on the tongue. Conductive electrical leads or traces on the flexure extend over the gimbal to the slider mounting region. Sections of the traces overlaying stainless steel portions of the flexure are separated from the stainless steel by a dielectric insulating layer. When the suspension is operated in a disk drive, the spring region of the load beam controls the height at which the head slider flies over the spinning disk. The gimbal allows the head slider to resiliently move in pitch and roll directions during the drive operation.

The load beam spring region is configured to provide precise mechanical properties such as spring rate. Similarly, the flexure gimbal is configured to provide precise mechanical properties such as pitch and roll stiffness. In order to minimize the effects of the traces on these properties, the traces are sometimes routed off the load beam spring region and off the flexure spring arms at locations were the traces traverse these portions of the load beam and flexure. The stainless steel layer is typically removed from the sections of the traces that are routed off of the load beam spring region and flexure gimbal (i.e., the unsupported trace sections) to further reduce the impact of these components on the mechanical properties of the load beam spring region and flexure gimbal. Unfortunately, these mechanical performance advantages are achieved at the expense of detrimental impacts on the electrical performance of the flexure. Removing the stainless steel layer adjacent to the traces creates impedance mismatches along the length of the traces, thereby limiting the overall impedance and bandwidth of the circuit.

There remains, therefore, a continuing need for improved disk drive head suspensions and flexures. In particular, there is a need for suspensions and flexures having high-performance mechanical properties along with relatively low impedance and high bandwidth electrical characteristics. The suspension and flexure should also be relatively efficient to manufacture.

SUMMARY OF THE INVENTION

The present invention is an improved flexure having high-performance mechanical properties along with relatively low impedance and high bandwidth electrical characteristics. One embodiment of the flexure includes a base region, a gimbal extending from the base region and conductive traces. The gimbal has spring arms and a slider mounting region extending from spring arms. One or more unsupported trace sections extend from the slider mounting region to the base region off of the spring arms. One or more metal islands are located on the unsupported trace sections.

DETAILED DESCRIPTION OF THE PREFERRED EMBODIMENTS

Figure 1:
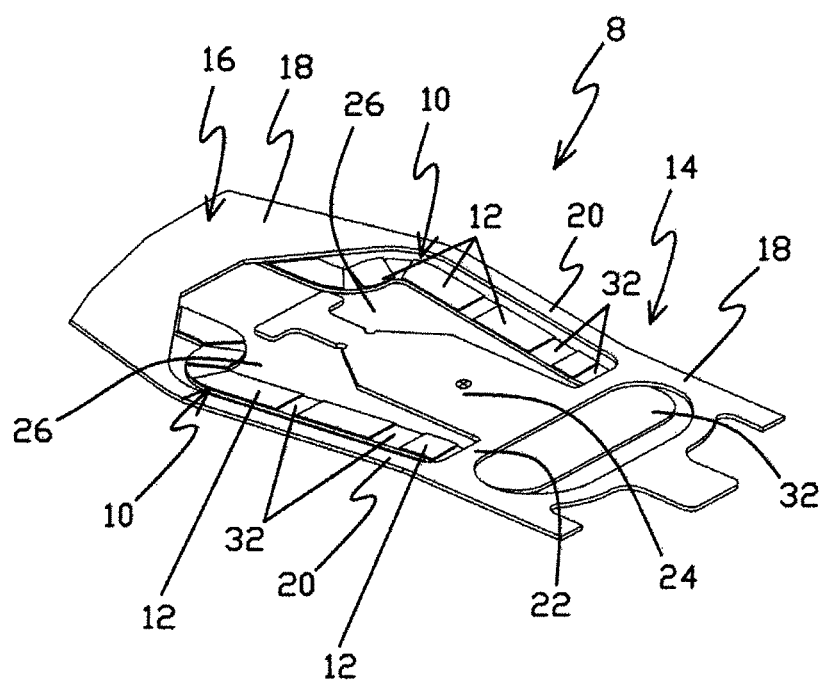
FIG. 1 is an isometric view of the stainless steel side of a gimbal of a flexure including continuous stainless steel ground planes in accordance with one embodiment of the invention.
Figure 2:
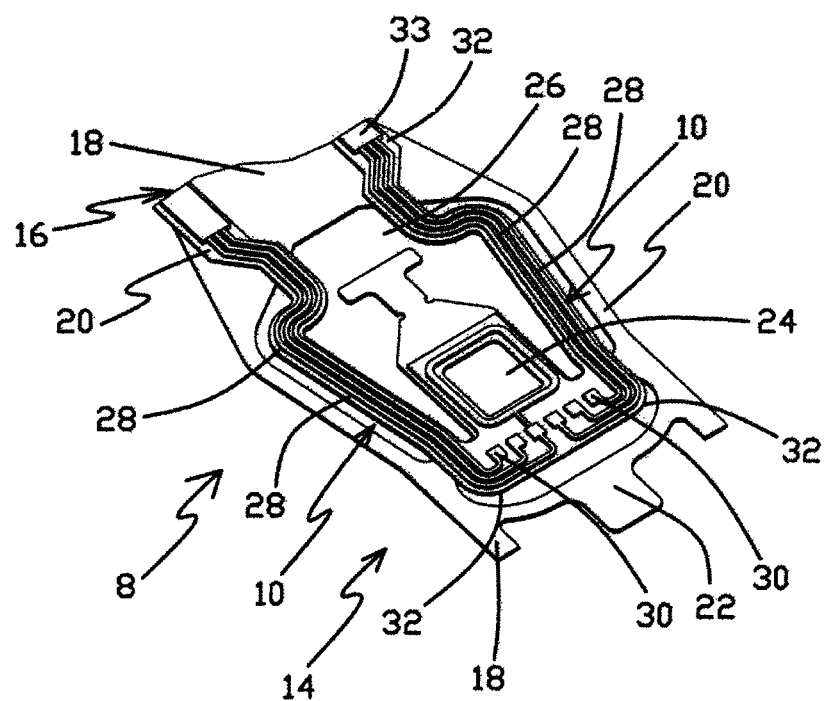
FIG. 2 is an isometric view of the trace side of the flexure gimbal shown in FIG. 1.

FIGS. 1 and 2 are illustrations of the distal end of a disk drive head suspension flexure 8 having gimbal suspended trace sections 10 with stainless steel ground or reference plane islands 12 (visible only in FIG. 1) in accordance with one embodiment of the invention. FIG. 1 is an illustration of the flexure 8 from the stainless steel side. FIG. 2 is an illustration of the flexure 8 from the trace side, the side opposite the stainless steel side. With the exception of the reference plane islands 12 described below, flexure 8 can be of any conventional or otherwise known design, and can be mounted to a conventional load beam (not shown) in a conventional manner.

Flexure 8 includes a gimbal 14 extending from a mounting or base region 16. Both the gimbal 14 and base region 16 include structures formed from a stainless steel (e.g., a spring metal) layer 18. The gimbal 14 includes a pair of transversely spaced spring arms 20 extending from a distal end of the base region 16 and a cross member 22 that extends between the spring arms near a distal portion of the flexure 8. A tongue having a slider mounting region 24 that is also formed from the stainless steel layer 18 extends from the cross member 22 into the open region 26 between the spring arms 20. A plurality of conductive traces 28 extend across the gimbal 14 from head terminal pads 30 on the slider mounting region 24 to the base region 16. An insulating layer 32 is located between the traces 28 and portions of stainless steel layer 18 that the traces overlay to electrically isolate the traces from the stainless steel layer. An insulating cover layer 33 overlays portions of traces 28 on the base region 16.

As shown, the traces 28 include gimbal suspended sections 10 that extend across the open region 26 of the gimbal 14 and do not overlay the spring arms 20. In the embodiment shown in FIGS. 1 and 2 the suspended sections 10 of traces 28 extend from the cross member 22 to the base region 16. A plurality of spaced-apart reference plane islands 12 cover substantial portions of the sides of traces 28 on the stainless steel side of the flexure 8. In the illustrated embodiment none of the reference plane islands 12 is in contact with portions of the gimbal 14 or base region 16 formed from the stainless steel layer 18. Insulating layer 32 is located between the traces 28 and reference plane islands 12 to electrically isolate the traces from the reference plane islands. The illustrated embodiment of the invention also includes insulating layer 32 on the stainless steel side portions of traces 28 between the reference islands 12 and between the reference islands and cross member 22 and base region 16. In other embodiments (not shown) the stainless steel side portions of traces 28 between the reference islands 12 do not include the insulating layer 32. Reference islands 12 can have the same thickness or different thickness than that of stainless steel layer 18. In some embodiments, for example, reference islands 12 are thinner than stainless steel layer 18. The reference plane islands 12 can also be formed from metals or other suitably conductive materials other than stainless steel. In still other embodiments of the invention (not shown) the gimbal suspended sections of the traces are located outside of the gimbal spring arms (e.g., opposite the spring arms from the slider mounting region).

An important advantage of reference plane islands 12 on the unsupported sections 10 of traces 28 is the reduction and increased consistency of trace impedance and the increase of signal transmission bandwidth. Since neither the unsupported sections 10 of the traces 28 or the reference plane islands 12 overlay or otherwise substantially contact the gimbal spring arms 20, their impact on the mechanical properties of the gimbal 14 can be minimized or kept relatively low. The stiffness of the unsupported sections 10 of the traces 28 is much lower than the stiffness of the spring arms 20. The spaces between the reference plane islands 12 further contribute to the minimization of impact on the mechanical properties of the gimbal 14 by enhancing the flexibility of the unsupported sections 10 of the traces. Similarly, in general, the thinner the reference plane islands 12, the lower the impact they will have on the mechanical properties of the gimbal 14. The number, length and spacing of the reference plane islands 12 can vary from that shown in FIG. 1. Although there are spaces between the reference plane islands 12, they cover substantial portions of the unsupported sections 10 of the traces 28 and effectively function as an electrically continuous reference plane. The reference plane islands 12 illustrated in the embodiment shown in FIG. 1 extend across the with of two traces. In other embodiments (not shown), a separate reference plane island is located below each trace. Still other embodiments (not shown) have reference plane islands that extend across the width of more that two traces.

Flexure 8 can be manufactured by additive and/or subtractive processes using conventional or otherwise known deposition, photolithography and etching processes. By way of example, one embodiment of flexure 8 is formed from a laminated sheet of material including a stainless steel or other spring metal layer and a layer of copper alloy or other conductor separated by a layer of polyimide or other insulator. The stainless steel portions of the flexure such as the spring arms 20 and the reference plane islands 12 can be etched from the stainless steel layer. The reference plane islands 12 or portions thereof can also be partial etched to reduce their thickness. Other embodiments of flexure 8 are manufactured by depositing the portions of conductive layer 32 and traces 28 on a stainless steel layer 18. In this embodiment the reference plane islands 12 can also be formed by deposition processes. The reference plane islands can also be formed from metals or other suitable conductive materials that are different than the stainless steel or other spring metals used for the spring arms 20 and other structural portions of the gimbal 14.

Figure 3:
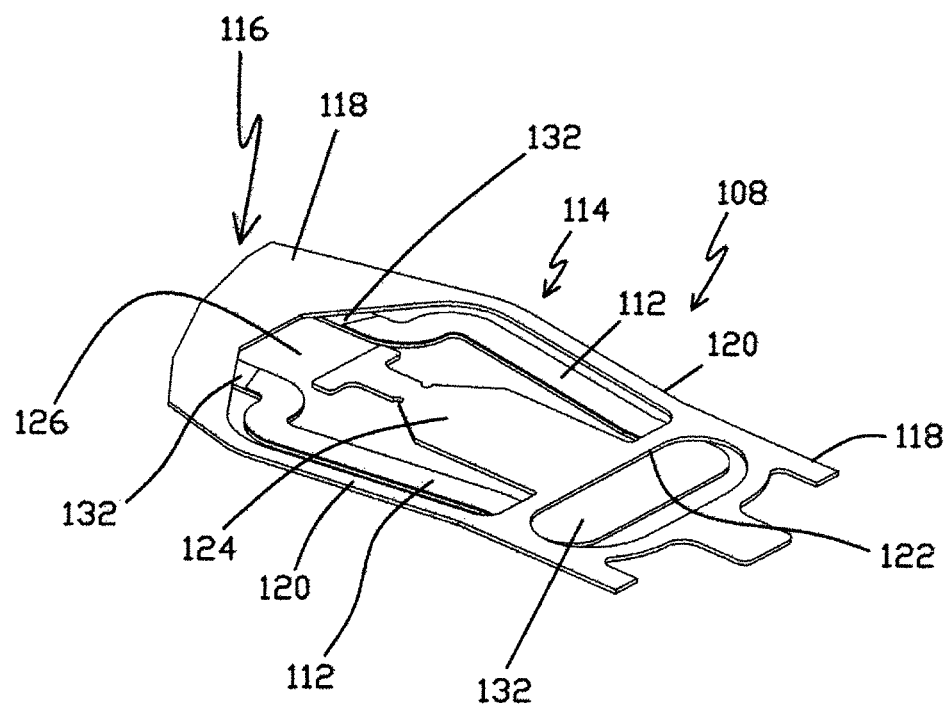
FIG. 3 is an isometric view of the stainless steel side of the gimbal of a flexure including a continuous stainless steel ground plane in accordance with another embodiment of the invention.

FIG. 3 is an illustration of a flexure 108 having gimbal unsupported sections 110 of traces (not visible in FIG. 3) in accordance with another embodiment of the invention. As shown, a single reference plane island 112 extends over substantial portions of the unsupported sections 110 of traces 128. Other than having a single reference plane island 112, the features and methods of manufacture of the reference plane island and flexure 108 can be substantially the same as or similar to those of flexure 8 described above in connection with FIGS. 1 and 2, and similar features are identified by similar reference numbers.

Figure 4:
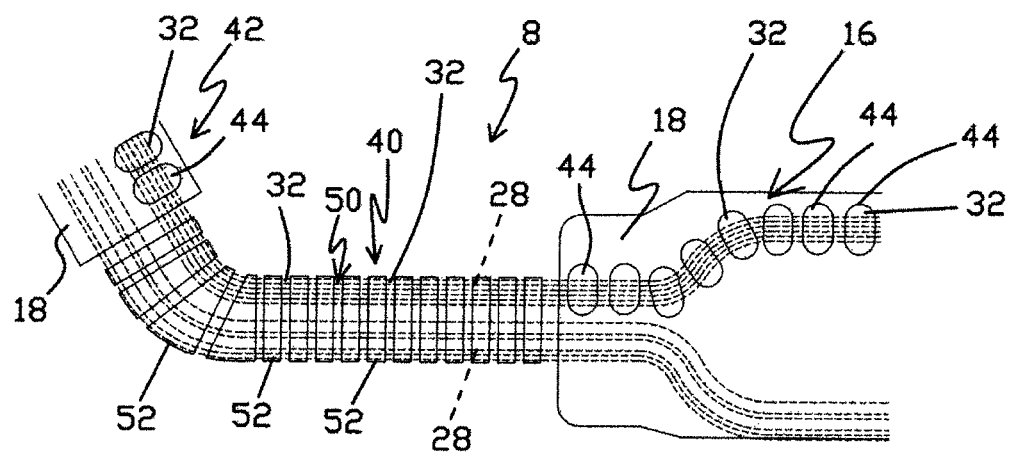
FIG. 4 is an illustration of the stainless steel side of a spring-traversing region and portions of the base region and tail of the flexure shown in FIG. 1.

FIG. 4 is an illustration of the stainless steel side of a portion of flexure 8 located proximal to the end shown in FIG. 1, including part of the proximal end of the base region 16, a spring-traversing region 40 and a portion of tail 42. As shown, both the base region 16 and tail 42 include webbing or windows 44 through the stainless steel layer 18 at locations where the stainless steel layer overlays one of the sets of traces 28. In one embodiment the windows 44 overlay only the reader traces. However, in other embodiments the windows 44 also overlay other traces 28 such as the writer traces, or only the other traces. Still other embodiments (not shown) also include windows such as 44 through the stainless steel layer 18 of only the base region 16 or the tail 42. Yet other embodiments (not shown) include windows such as 44 through the stainless steel layer 18 of the base region 16 and/or the tail 42 at locations where the stainless steel layer overlays the second set of traces 28.

The spring-traversing region 40 of the flexure 8 is configured to extend across the spring or radius region of the load beam (not shown) to which the flexure is mounted. In particular, similar to the gimbal suspended sections 10 of traces 28, the spring-traversing region 40 includes spring region suspended section 50 of traces 28 that do not traverse the primary spring metal portions of the load beam spring region. The illustrated embodiment of spring-traversing region 40, for example, has suspended section 50 of traces 28 that is configured to extend across the spring region of a load beam between a pair of spaced-apart spring arms (not shown). Other embodiments of the invention include suspended sections such as 50 that are configured to extend off the outer edge of the beam region of the load beam to which they are mounted (not shown) and around the outside edge of the spring region.

Similar to the suspended sections 10 on the gimbal 14, the suspended section 50 of traces 28 includes spaced-apart reference plane islands 52. In the embodiment shown in FIG. 4 the reference plane islands 52 extend across the width of all of traces 28, although in other embodiments (not shown) the reference plane islands can extend over groups of fewer or individual traces 28. In general, the suspended section 50 of traces 28 and their reference plane islands 52 can have features that are substantially the same as or similar to those of suspended sections 10 and 110 and islands 12 and 112 described above with reference to FIGS. 1-3. Similarly, the suspended sections 50 of traces 28 and their reference plane islands 52 can be manufactured by processes that are substantially the same as or similar to those of suspended sections 10 and 110 and islands 12 and 112 described above with reference to FIGS. 1-3.

The advantages offered by suspended section 50 of traces 28 are similar to those described above in connection with suspended sections 10 and 110. For example, the suspended section 50 of traces 28 enhances the impedance and bandwidth characteristics of the flexure without substantial detrimental impact on the mechanical spring functions of a load beam spring region. They can also be efficiently manufactured. Furthermore, combining suspended sections such as 10 and/or 50 with the windows 44 in the base region 16 and/or tail 42 enables further enhancement of the overall impedance characteristics (e.g., impedance matching and consistency) of the traces 28 across flexure 8.

Although the present invention has been described with reference to preferred embodiments, those skilled in the art will recognized that changes can be made in form and detail without departing from the spirit and scope of the invention.

What is claimed is:

1. An integrated lead flexure including a layer of stainless steel, comprising:
    a base region in the stainless steel layer;
    a gimbal in the stainless steel layer extending from the base region, including:
        stainless steel gimbal spring arms; and
        a stainless steel slider mounting region extending from the spring arms; and
    conductive traces, including:
        one or more unsupported trace sections extending from the slider mounting region to the base region off of the spring arms; and
        at least three stainless steel metal islands in the stainless steel layer on each of the unsupported trace sections, where the metal islands cover greater than 50% of the lengths of each of the unsupported trace sections.

2. The integrated lead flexure of claim 1 and further including an insulating layer between the metal islands and the unsupported trace sections.

3. The integrated lead flexure of claim 2 wherein the metal islands have a thickness that is less than a thickness of the spring arms.

4. The integrated lead flexure of claim 2 wherein the metal islands have a thickness that is equal to a thickness of the spring arms.

5. The integrated lead flexure of claim 1 wherein the base region, slider mounting region, spring arms and metal islands are formed from a common layer of metal.

6. The integrated lead flexure of claim 1 wherein the base region, slider mounting region, spring arms and metal islands are formed by etching a common layer of metal.

7. The integrated lead flexure of claim 1 wherein:
    the flexure further includes a spring-traversing region; and
    the conductive traces further include:
        an unsupported spring-traversing trace section for extending across a load beam spring region off of load beam spring arms; and
        one or more stainless steel metal islands in the stainless steel layer on the unsupported spring-traversing trace sections.

8. The integrated lead flexure of claim 7 and further including an insulating layer between the one or more metal islands and the unsupported spring-traversing trace sections.

9. The integrated lead flexure of claim 8 wherein the one or more metal islands overlay substantial portions of the lengths of the unsupported spring-traversing trace sections.

10. The integrated lead flexure of claim 8 wherein the one or more metal islands have a thickness that is less than a thickness of the load beam spring arms.

11. The integrated lead flexure of claim 8 wherein the one or more metal islands have a thickness that is equal to a thickness of the load beam spring arms.

12. The integrated lead flexure of claim 9 wherein the base region, slider mounting region, gimbal spring arms, metal islands on the gimbal unsupported trace sections and metal islands on the unsupported spring-traversing trace sections are formed from a common layer of metal.

13. The integrated lead flexure of claim 9 wherein the base region, slider mounting region, gimbal spring arms, metal islands on the gimbal unsupported trace sections and metal islands on the unsupported spring-traversing trace sections are formed by etching a common layer of metal.

14. The integrated lead flexure of claim 7 wherein the base region includes one or more windows in a spring metal layer overlaying at least some of the traces.

15. The integrated lead flexure of claim 14 wherein:
    the flexure further includes a tail including the spring metal layer having the one or more windows extending from the spring-traversing region; and
    at least some of the traces extend over the tail and overlay the windows.

16. The integrated lead flexure of claim 9 wherein:
    the flexure further includes a tail including a spring metal layer having one or more windows extending from the spring-traversing region; and
    at least some of the traces extend over the tail and overlay the windows.

* * * * *

UNITED STATES PATENT AND TRADEMARK OFFICE
CERTIFICATE OF CORRECTION

PATENT NO. : 8,416,532 B1
APPLICATION NO. : 11/734932
DATED : April 9, 2013
INVENTOR(S) : Mark A. Miller et al.

Page 1 of 1

It is certified that error appears in the above-identified patent and that said Letters Patent is hereby corrected as shown below:

In the Claims

Column 6, line 20, delete "9" and insert therefor --7--.

Column 6, line 25, delete "9" and insert therefor --7--.

Column 6, line 39, delete "9" and insert therefor --7--.

Signed and Sealed this
Tenth Day of September, 2013

Teresa Stanek Rea
*Acting Director of the United States Patent and Trademark Office*